(12) United States Patent
Kuckes (10) Patent No.: US 8,113,298 B2
(45) Date of Patent: Feb. 14, 2012

(54) WIRELINE COMMUNICATION SYSTEM FOR DEEP WELLS

(75) Inventor: Arthur F. Kuckes, Ithaca, NY (US)

(73) Assignee: Vector Magnetics LLC, Ithaca, NY (US)

( * ) Notice: Subject to any disclaimer, the term of this patent is extended or adjusted under 35 U.S.C. 154(b) by 407 days.

(21) Appl. No.: 12/342,034

(22) Filed: Dec. 22, 2008

(65) Prior Publication Data
US 2010/0155138 A1   Jun. 24, 2010

(51) Int. Cl.
*E21B 47/024* (2006.01)
*E21B 47/02* (2006.01)
(52) U.S. Cl. .......... 175/45; 175/41; 175/61; 175/315
(58) Field of Classification Search .......... 175/24, 175/41, 45, 61, 315; 166/385, 241.5
See application file for complete search history.

(56) References Cited

U.S. PATENT DOCUMENTS 5,064,006 A * 11/1991 Waters et al. .......... 175/45

* cited by examiner

*Primary Examiner* — Brad Harcourt
(74) *Attorney, Agent, or Firm* — Jones, Tullar & Cooper, PC (57) ABSTRACT

A wireline apparatus for deep well measurements in a borehole being drilled includes a drill string having multiple drill pipe sections connected end-to-end, with at least one of the drill pipe sections being electrically conductive and isolated to provide an electrode section. A nonmagnetic drill pipe section is connected in the drill string below said electrode section, and a hydraulic motor having a rotatable drill bit carrying a drill bit instrument sub having a magnetic field sensing instrument package is connected to a lowermost end of the drill string. A wireline locatable within said drill string incorporates an electrode locatable within the drill pipe electrode section, and carries at its distal end a wireline instrument package that is locatable within the nonmagnetic drill pipe section to receive data representing magnetic field data from the magnetic field sensing instrument package. A time-variable AC source is connected to the wireline to energize the drill pipe electrode section by way of the wireline electrode to produce a corresponding target current magnetic field to be detected at the drill bit instrument.

25 Claims, 6 Drawing Sheets

FIG. 4
Drill Bit Instrumentation sub

FIG. 7
Instrumentation package on wireline

WIRELINE COMMUNICATION SYSTEM FOR DEEP WELLS

FIELD OF THE INVENTION

The present invention relates, in general, to methods and apparatus for locating the distance and direction to a conductive target, such as a cased well or borehole, from a remote location such as a rescue borehole or well to obtain data for use in guiding the direction of drilling the rescue well to intersect the target, and, more particularly, to methods and apparatus for injecting time-varying electrical currents into the earth from one or more electrodes in the rescue borehole, for detecting at the drill bit of the rescue well electromagnetic field vectors resulting from such injected currents flowing in the target, and for transmitting data representing the detected fields to the earth's surface.

BACKGROUND OF THE INVENTION

It is well known that in drilling boreholes in the earth, such as deep wells for oil and gas exploration, precise control of the path followed by the well is extremely difficult, so that it is virtually impossible to know the exact location of the well at a given depth. For example, a drilling tolerance of plus or minus one quarter of a degree will allow the bottom of a 10,000-foot well to be positioned anywhere within a circle 100 feet in diameter, and numerous factors can increase the deviation. This is not of particular concern in many drilling operations, but if drilling precision is necessary, as where a borehole is to be drilled precisely to a target location, such variations can cause severe difficulties. One example of the need for precision drilling occurs in the situation where it becomes necessary to drill a relief well to intersect an existing deep well, as in the case where the casing of the deep well has ruptured and it becomes necessary to plug the well at or below the point of the rupture to bring it under control. In order to do this, the relief well must be drilled to intersect the original well at the desired level, and since such ruptures, or blowouts, often produce extremely hazardous conditions at the surface in the vicinity of the original well, the relief well usually must be started a considerable distance away from the original wellhead and drilled at an incline down to the desired point of intersection.

Because the same problems of control of the direction of drilling that were encountered in the original well are also encountered in drilling the relief well, the location of the relief well borehole also cannot be known with precision; accordingly, it is extremely difficult to determine the distance and direction from the end of the relief well to the desired point of intersection on the target well. In addition, the relief well usually is very complex, compounding the problem of knowing exactly where it is located with respect to a target that may be 10 inches in diameter at a distance of thousands of feet below the earth's surface.

Numerous early attempts were made to solve the problem of guiding a relief well to accurately intersect a target well. Some utilized surveying techniques to locate the relief well with respect to a target well, but such survey techniques are not capable of providing accurate data concerning the relationship of the relief well to the original well until the relief well has approached very near the original well. Magnetic gradient ranging equipment can be used with considerable accuracy at close range; however, it has been found that outside a radius of a few tens of feet, such systems are usually inadequate.

In an attempt to extend the distance at which accurate information can be obtained, a variety of electrical well logging techniques have been used which treat the target well as an anomaly in the geologic structure of the earth surrounding the relief well. Some of these systems are directed to the measurement of the apparent resistivity of the earth across a pair of electrodes but, since no directionality is given by this method, it is ineffective for directing a relief well toward an existing well.

In addition, there have been attempts to obtain similar data through the use of electromagnetic prospecting, where induction sensing coils mounted at right angles to each other are used in conjunction with other conventional well logging systems to determine the probable location of a target. However, such systems do not suggest the possibility of locating relatively small targets such as well bores.

Other systems have been developed for directing a second well with respect to a first well by the use of sonic detectors responsive to the sound produced by fluids flowing out of a blown well formation. However, such systems will not operate when there is no sound emanating from the target well, and, in addition, do not provide the required degree of directional and distance accuracy. Another proposal in the prior art is the use of a signal transmitter in one well and a signal receiver in the other well, wherein sound waves or magnetic fields may be used as the signals. In these latter systems, however, the target well must be accessible so that the signal source can be placed in one well and the receiver in the other, and they are not effective where the target well is not open.

Many of the difficulties outlined above were overcome in the prior art by methods and apparatus disclosed, for example, in U.S. Pat. Nos. 4,323,848, 4,372,398, 4,700,142, and 5,512,830, all issued to Arthur F. Kuckes, the applicant herein. In accordance with such prior art patents, an electric current flow is produced in a target such as the casing of a target well by injecting a low frequency alternating current into the earth surrounding the target well through the use of an electrode located in the relief well, or borehole. This current flow extends between the downhole electrode and a second electrode that may be located at the earth's surface in the vicinity of the head of the relief well. The injected earth current finds a path of least resistance through the casing or other current-conducting material in the target borehole, and the resulting concentration of current produces a characteristic magnetic field surrounding the target well which can be detected by an AC magnetic field sensor such as that described in U.S. Pat. No. 4,323,848, or by multiple sensors, as described in U.S. Pat. No. 5,512,830. These sensors are extremely sensitive to very small magnetic fields, and accurately detect the vectors of magnetic fields produced by currents flowing in well casings located a considerable distance away from the relief borehole.

The vector signals obtained from the AC magnetic field sensors, in accordance with the aforesaid patents, permit calculation of the direction and distance to the target well casing with respect to the location of the AC magnetic field sensor in the relief well. This information can be used to guide further drilling of the relief well. Thus, as the relief well approaches a desired depth, its approach to the location of the target well can be guided so that the target well is intersected at the desired depth below the earth's surface in a rapid and effective manner. This method of guiding a relief well to intersect with a target is a homing-in process, wherein multiple measurements—often after every 50 feet of drilling—must be made as the relief borehole approaches the target, so that more time is spent measuring than is spent drilling. This need for making so many measurements makes the drilling of a relief well very expensive, especially in off-shore drilling, wherein, using the prior methods, the drill string for the relief well must be pulled for each measurement.

The foregoing systems are widely, and successfully, used; however, each of them requires a periodic withdrawal of the drill string so that suitable sensors and electrodes for generating the ground current can be lowered into place and so that distance and direction measurements from the relief well to the target can be obtained. Since a drilling rig operation can cost upwards of $500,000.00 per day in offshore drilling operations, the time-consuming process of halting the drilling, withdrawing the drill string, and positioning the measuring equipment is an extremely expensive procedure Accordingly, a method and apparatus for making such measurements without the effort and expense of pulling the drill string is needed.

Furthermore, in a typical borehole drilling operation, the path of the borehole, which may be a relief well as described above, is tracked during drilling by a "measurement while drilling" (MWD) instrument that is mounted near the bottom of the drill string. Usually, such a string consists of a series of steel tubes, each about 10 meters in length and connected end-to-end. Connected at the bottom end of the drill string is a non-magnetic section which carries the MWD instrument, and below that, a hydraulic drilling motor having a bent housing to which the drill bit is connected via a drill shaft, with each of the non-magnetic section and the bent housing being about 10 meters in length. As a result of this, the MWD instrument is typically located 10-20 meters above the face of the drill bit, so that when magnetic field measurements are made with the drill string in the relief well, they are actually made a considerable distance from the drill bit, introducing a significant error in determination of the relative distance and direction of the target with respect to the drill bit. This greatly increases the difficulty of accurately controlling the intersection of the borehole being drilled with the target.

Accordingly, there is a need for a measurement system that will significantly increase the accuracy of distance and direction calculations in drilling, while reducing the cost of making such calculations.

SUMMARY OF THE INVENTION

Briefly, the present invention is directed to an improved method and apparatus for determining the distance and direction from the drill bit of a relief well drill string to a target location, such as the center of an existing borehole casing, without the need to withdraw the drill string to make the necessary measurements, while still making the measurements from the bottom of the relief well so that accurate calculations can be made. In accordance with one aspect of the present invention, the need for pulling a drill string in order to make magnetic field measurements in a relief well, or borehole, is obviated by the use of magnetic field sensors mounted in a drill bit instrument package that is secured to the drill bit, in combination with a drill string wireline having a suitable current-injecting electrode and a wireline instrument package which can be dropped down through the center of the drill string whenever a measurement is to be made. The electrode is energized with a time-varying current to produce a corresponding magnetic field generated by current flow in the target, and the drill bit instrument detects that magnetic field at the drill bit. The drill bit instrument transmits data representing the measured field vectors, and the wireline instrument package receives that data and transmits it to the surface for use in guiding further drilling. The wireline is then withdrawn, and drilling can be resumed.

The foregoing process is carried out, in accordance with another aspect of the invention, by a modified drill string structure having at least one insulating segment, but preferably two such segments, spaced apart to electrically isolate a selected conventional tubular, electrically conductive, steel drill string pipe section near the bottom of the string to form a drill string electrode. These pipes are generally about ten meters in length and are joined end-to-end, with sections being added to the drill string as drilling progresses. Each insulating segment, or sub, is about one meter in length, so that a single sub is generally sufficient for electrical isolation, although additional subs may be used, as needed. The drill string preferably includes a single such electrode section, although in some circumstances it may be desirable to include two spaced electrode sections separated and isolated from each other by at least one insulating sub. If desired, they may be spaced further apart by including one or more non-electrode steel pipe sections between the insulating subs for the electrode sections. The modified drill string includes a non-magnetic segment, in which is mounted a conventional MWD instrument, and the lowermost (distal) end of the drill string is a standard rotating drill bit connected to the shaft of a standard hydraulic drilling motor incorporating, in a preferred form of the invention, a bent housing for directional drilling control, in known manner. As is known, the drilling motor may be driven by drilling fluid that flows down the center of the drill string and back up the borehole outside the string.

When a magnetic field measurement is to be made using the drill string of the invention, drilling is halted, and instead of withdrawing the drill string, a wireline carrying a wireline electrode is lowered through the center of the drill string until the wireline electrode is aligned with the approximate center of the corresponding isolated steel drill pipe electrode section. The wireline electrode is in electrical communication with its corresponding isolated steel drill pipe electrode section which is, in turn, in electrical communication with the surrounding earth formations. When the wireline is energized, the drill pipe electrode injects current from the wireline electrode into the surrounding formations and a portion of that current is then collected in the target. The electrodes are energized by a periodic time-varying current, such as a sinusoidal AC supplied from a power supply at the earth's surface, to produce a characteristic target current and corresponding target magnetic field. The wireline electrode is immersed in the drilling fluid, which may be electrically conductive to provide electrical communication between it and its corresponding drill pipe electrode. In the case where a non-conductive drilling fluid is used, spring-loaded contacts may be employed on the wireline electrode to provide a positive electrical contact with the inner surface of the isolated steel drill pipe section.

In accordance with the present invention, the desired magnetic field measurements are made at the drill bit sensor, or magnetic field detector, that is located in the drill bit instrument package described above. This location for the drill bit sensor is advantageous, because it is close to the actual location of the drill bit that is to be controlled. The drill bit instrument is battery-operated, and in addition to suitable magnetic field vector detectors and gravity vector detectors, it incorporates suitable electromagnetic telemetry, such as an electromagnetic solenoid, for transmitting data from the drill bit sensor instrument to the wireline instrument in the drill string. The wireline instrument includes suitable telemetry to remotely receive the data from the drill bit sensor and to transmit that data to the surface.

In another embodiment of the invention, magnetic field measurement accuracy may be improved in some circumstances by operating the system in a pulsed transient mode, wherein the earth formations surrounding the relief and the target wells are energized by a stepped, or pulsed, primary excitation current from a power source which preferably is at the surface, and measurements of magnetic fields produced by the resulting current flow in the target are made immediately following a stepwise turn-off of the excitation current, when that current is zero. Each pulse of electrical energy supplied to the wireline electrode causes a current to flow through the earth's formations to the target, and, as described in the foregoing U.S. Pat. No. 4,700,142, this current is collected on the electrically conductive target. The resulting target current flow creates a characteristic target magnetic field that is detected by the drill bit sensor instrument. In the pulsed, or transient, mode of operation of the present invention, the magnetic field measurement is made after the primary energizing current stops. The magnetic fields that are measured when the excitation current is zero are caused by a decaying target well current flow. Although this decay current produces only a very small field, since even the primary target current typically is only a few percent of the energizing current, the measurement of the decay field is more accurate, since interfering fields caused by the primary electrode current in the earth are not present.

To enhance this transient pulsed current magnetic field measurement, the drill string of the present invention incorporates at least two spaced, electrically isolated conductive drill string pipe sections, each separated from each other and other adjoining pipe sections by one or more electrically insulating subs. Deep well measurements are made by aligning corresponding spaced-apart wireline electrodes with the approximate centers of corresponding isolated drill pipe sections to effectively produce two drill pipe injection electrodes spaced along the drill string above the drill motor, by supplying a time-variable current to the electrodes to inject a current in the earth and producing a corresponding time-varying target current, and by detecting the resulting target magnetic field vectors at the location of a drill bit sub. Telemetry at the drill bit sub transmits the detected vector data uphole for use in calculating the distance and direction from the drill bit sub to the target.

BRIEF DESCRIPTION OF THE DRAWINGS

The foregoing and other features and advantages of the present invention will be understood by those of skill in the art from the following detailed description of preferred embodiments thereof, taken with the accompanying drawings, in which:

FIG. 9(*a*) illustrates a wireline electrode excitation current having a transient excitation waveform, in accordance with another embodiment of the invention, while FIG. 9(*b*) illustrates a corresponding target transient waveform caused by the excitation current of FIG. 9(*a*);

DESCRIPTION OF PREFERRED EMBODIMENTS

Figure 1:
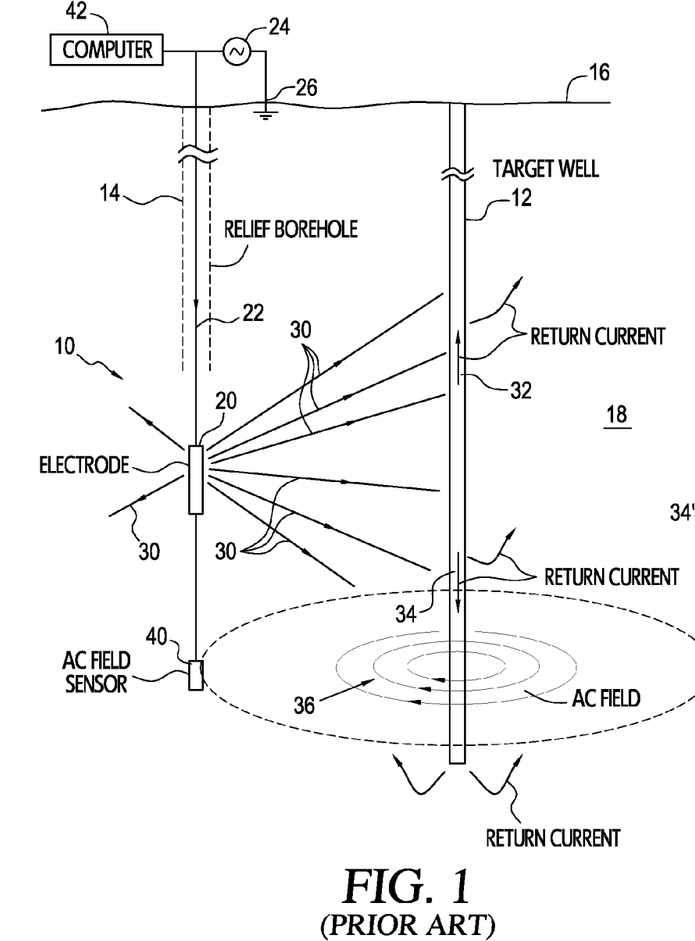
FIG. 1 is a diagrammatic illustration of a prior art electromagnetic target location system.

Turning now to a more detailed consideration of the present invention, FIG. 1 illustrates, in diagrammatic form, a standard well locating system 10 such as that described in U.S. Pat. No. 4,700,142, the disclosure of which is hereby incorporated herein by reference. In such a system, a target well 12 is to be intersected by drilling a relief borehole, or well, 14 along a path that will intersect the target at a desired depth below the earth's surface 16. The target well is cased, or has a drill string or other electrically conductive material in it, so that electrical current flowing in the earth's formations 18 surrounding the well 12 will tend to be concentrated on that conductive material. An alternating electrical current is injected into the earth by an electrode 20 carried by a logging cable, or wireline 22, which is lowered into the relief borehole 14 after the drill string that is used to drill the relief borehole has been pulled out. The electrode is connected through wireline 22 to one side of an AC source 24, the other side of which is grounded at 26 to the earth. The electrode 20 contacts the uncased sides of the relief well so that current from source 24 is injected into the earth formations 18, as illustrated by arrows 30.

Figure 2:
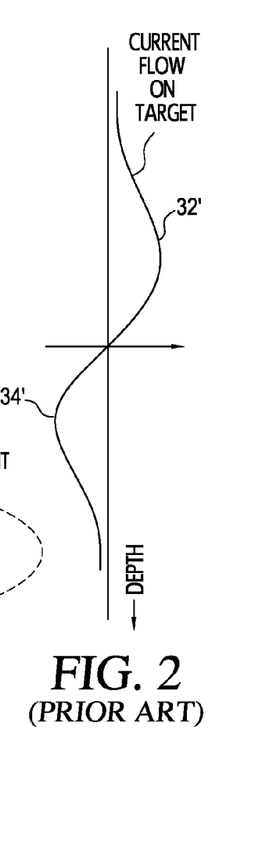
FIG. 2 is a graph illustrating target current flow amplitude in the system of FIG. 1.

This injected current, which returns to the grounded side of the generator at 26, finds a path of least resistance through the casing or other conductive material in target well 12, producing a target current flow indicated by arrows 32 and 34, respectively, above and below the depth of the electrode 20. The upward current flow of current 32 is illustrated in FIG. 2 by curve 32', while the downward flow of target well current 34 is illustrated in FIG. 2 by curve 34'. As illustrated, at the depth of the electrode equal and opposite currents on the target produce a net zero target current, while above and below that point the target currents maximize and then decline due to leakage into the surrounding formation, as illustrated in FIG. 2, with these target well currents eventually returning to the ground point 26 through the earth.

The concentrated current flow on the target well produces, for the downward current 34, for example, a corresponding AC magnetic field 36 in the earth surrounding the target well. This target AC field is detectable by an AC field sensor, or sonde, 40 that is suspended in the relief well 14 by the wireline 22. The sonde 40, which preferably is located below the electrode 20, incorporates suitable field component detectors, such as three orthogonal magnetometers, to measure the vector components of magnetic field 36 and to produce corresponding data signals that are transmitted via the wireline to, for example, a computer 42 at the surface.

Vector signals obtained from the magnetometers in the sensor 40, together with measurements of other parameters such as the orientation of the sensor, permit calculation of the direction and distance of the target well casing from the sensor, as described, for example, in U.S. Pat. Nos. 4,700,142 or 5,512,830. In the course of drilling the relief well, the drill string is withdrawn periodically and the wireline is lowered into the relief borehole so that vector measurements and measurements of the orientation of the sensor within the borehole can be made, and these, together with measurements of the relief well direction made either at the same time or from previously made borehole survey data, permit a continuous calculation of the presumed location of the target well with respect to the location of the relief well. The wireline is then withdrawn and the drill reinserted into the relief well, and the calculated information is used to guide further drilling of the relief well. As the relief well approaches the desired depth, its approach to the location of the target well can be guided so that the target well is intersected at the desired depth below the earth's surface.

As discussed above, such prior systems require the withdrawal of the drill string from the relief well in order to measure the target magnetic field. A preferred form of the improved system of the present invention, which allows target field measurements without requiring the withdrawal of the relief drill string, is illustrated at 50 in FIG. 3, to which reference is now made. In accordance with the invention, a relief borehole, or well, 52, which is illustrated in dashed lines, is produced by a drill carried by a drill string 54 which, in conventional manner, is suspended from a surface drilling rig (not shown). Such a drill string typically consists of multiple drill string sections of steel pipe, such as the illustrated sections 56, 57, 58 . . . 59, each normally about ten meters in length and coupled together end-to-end at threaded joints. In conventional manner, the bottom, or distal end of the drill string incorporates a standard hydraulic drilling motor 62 in a bent housing 64, with the motor having a rotating drive shaft 66 connected to a drill bit 68. In accordance with the invention, the drill bit carries a drill bit instrument sub 70, to be described in detail below, which is secured to and rotates with the drill bit. Located in the drill string 54 just above the drilling motor housing 64 is a conventional measurement-while-drilling (MWD) measurement system for producing a log of the drilling and for use in controlling the direction of drilling.

Figure 3:
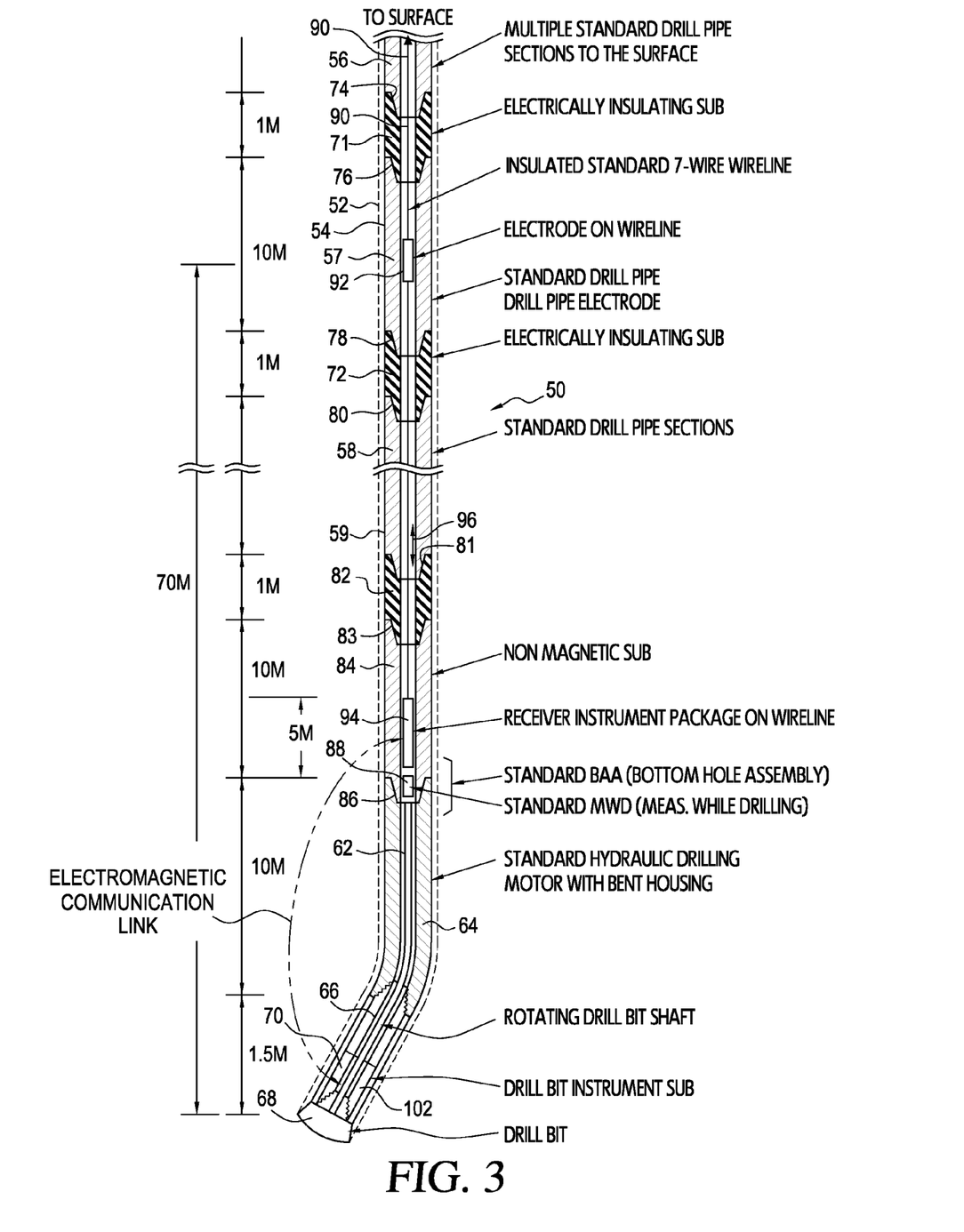
FIG. 3 is a diagrammatic illustration of a wire line electrode system in accordance with the present invention illustrating typical measurements.

In accordance with one embodiment of the invention, at least one of the electrically conductive drill pipe sections; for example section 57, is electrically isolated from adjacent drill pipe sections to form a pipe electrode for use in injecting current into the surrounding earth formations. This pipe electrode 57 is formed by inserting one or more electrically insulating subs 71 and 72, which may be short insulating pipe sections about one meter in length, in the drill string above and below the drill pipe section 57 that is to be isolated, as illustrated in FIG. 3. The insulating sub 71 is threaded to the bottom of standard steel pipe section 56 at threaded joint 74, and to the top of standard steel pipe section 57, at threaded joint 76, to space and electrically insulate the adjacent pipe sections 56 and 57 from each other. The second insulating sub 72 is threaded to the bottom of the steel drill pipe section 57 at threaded joint 78 and to the top of the next adjacent steel drill pipe section 58 at threaded joint 80. Sub 72 separates, and electrically insulates, adjacent steel pipe sections 57 and 58 from each other, thereby electrically isolating pipe electrode section 57 from the remainder of the drill string.

Although a single insulating sub is shown at each end of pipe section 57, it will be understood that multiple insulating subs may be used at each location to improve the isolation of pipe 57, as needed, or the insulating subs may be omitted if the resulting degraded performance is acceptable. The system will work without the upper insulated sub 71 because the "easy way" to return to the surface is through the earth, rather than along the walls of the drill pipes. The lower insulated sub 72 is very desirable, however, for even very tiny stray currents in the drill pipes in the vicinity of the sensor instruments (to be described) will seriously degrade the operation of the system.

Connected below the isolated drill pipe electrode section 57 are one or more additional steel drill pipe sections such as sections 58 . . . 59, the number of drill pipe sections being selected to position the electrode section 57 at a desired distance above the drill bit. A suitable distance between the pipe electrode 57 and the drill bit 68 may be about 70 meters.

In another embodiment of the invention, which may be desirable in some circumstances, a second steel pipe section such as pipe section 59 spaced below drill pipe electrode section 57 may also be electrically isolated from the remainder of the drill string by suitable insulating subs at its top and bottom ends The lowermost end of the bottom drill pipe 59 preferably is connected at a threaded joint 81 through an electrically insulating sub 82 and a threaded joint 83 to a nonmagnetic drill pipe section 84, the lower end of which is connected at threaded joint 86 to the top of drilling motor bent housing 64. A standard MWD instrument in an MWD housing 88 preferably is located within the nonmagnetic pipe section 84 in conventional manner. This arrangement allows the MWD equipment to detect surrounding magnetic fields during drilling, but also spaces the drill pipe electrode 57 at the desired distance above the drill bit instrument sub 70.

Locatable within the drill string 54 is a wireline 90, which is suspended from the earth's surface at the drill rig. During pauses in the drilling operation, the wireline is lowered into the relief well down through the central, axially-extending opening of the drill string. The drilling fluid flows through this axial opening to drive the motor 64, so the opening effectively terminates at the top of the motor. The wireline incorporates both power cables for injecting AC current into the earth and data cables for connecting down-hole instruments with the surface, and is covered by an insulating material such as an electrically insulating layer of a plastic such as Hytrel for protection from the harsh environment. The power cable in the wireline is connected to an electrode 92 which is uninsulated and is located on the wireline for electrical communication with the interior of the isolated drill pipe section 57. This electrode may physically contact the interior of section 57 by way of spring-loaded contacts, for example, although a good electrical connection can be made through the drilling fluid, or drilling mud, if it is electrically conductive, since this fluid remains within the drill string during this process. Many modern drilling fluids are a non-conductive synthetic material that is approximately 60% oil and 40% water, however, so a mechanical contact between the wireline electrode and the drill pipe may be preferred. The electrode 92 is accurately locatable centrally along the length of the drill string electrode section 57 simply by measuring the depth of the drill string.

The data cable in the wireline is connected to an instrument package 94 that is secured to the distal end of the wireline, below the electrode 92, with the wireline being long enough to locate this package centrally within the nonmagnetic sub 84. The power cable in the wireline is connected at the surface to a suitable source 24 (FIG. 1) of a periodically varying current such as a low-frequency AC to produce alternating current 96 in the cable, while the data cable is connected to suitable control circuitry at the surface, such as a computer 42 (FIG. 1).

As discussed above, the drill string of the present invention may incorporate two spaced electrode pipe sections 57 and 59 in certain circumstances. When such a second electrode pipe section is provided, the wireline carries a second electrode (not shown) which is positioned within the second drill pipe electrode section 59 for electrical contact with the interior of the corresponding pipe electrode 59 through physical contact and/or via the conductive drilling fluid in the drill string. This second electrode would be connected to the AC source 24 through the wireline power cable, as described for electrode 92.

Because the MWD measuring equipment 88 is conventionally located above the hydraulic drilling motor in well drilling operations, magnetic field and other measurements needed for determining the distance and direction to the target and for guiding the drilling operation are normally received at a distance of 10 to 20 meters behind the actual location of the drill bit that is being controlled. When target magnetic field vectors are determined at this distance, inaccuracies in the control of the drill bit occur, and these can produce unacceptable errors when the relief well is approaching the target.

Figure 4:
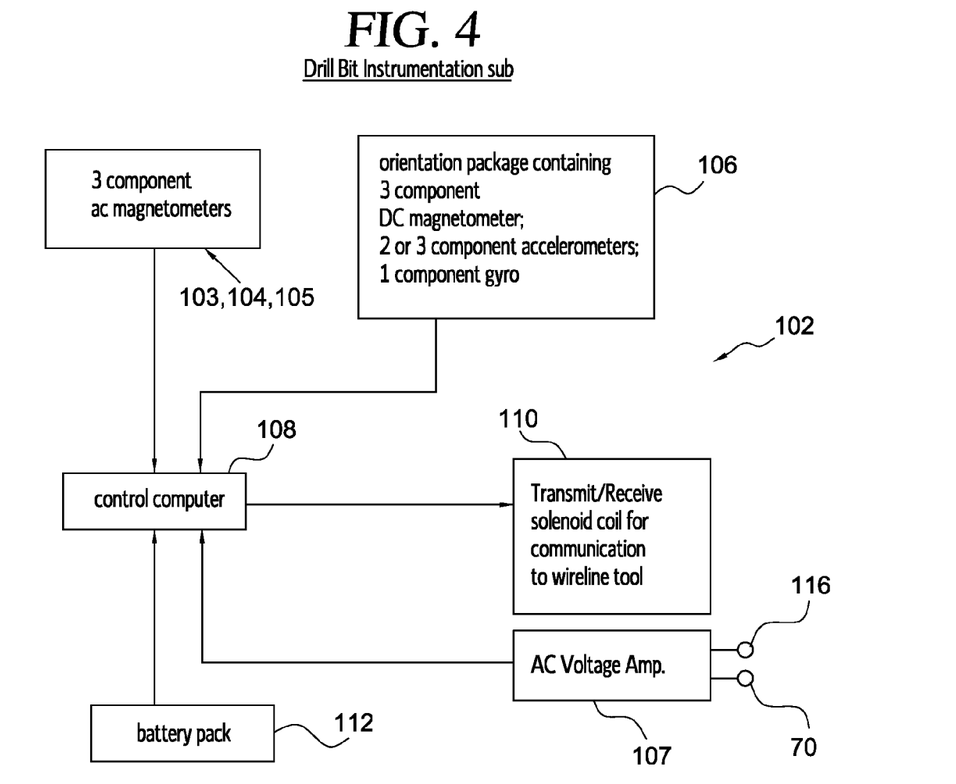
FIG. 4 is a diagrammatic illustration of a drill bit sub sensor instrument.

The foregoing problem is overcome, in accordance with the present invention, by providing magnetic field and other sensors in a drill bit sensor instrument package 102 mounted on the drill bit sub 70. The schematic diagram of this sensor instrument package 102 is illustrated in FIG. 4, and the sensor devices therein are illustrated diagrammatically in FIGS. 5 and 6. As therein shown, the instrument package 102 incorporates a three-component AC magnetometer having components 103, 104, and 105 for measuring x, y and z vector components of the varying electromagnetic field H that is generated by current flow on a target such as a well casing. These magnetometer components may be constructed using coils surrounding U-shaped cores in accordance with the teachings of U.S. Patent No. 4,502,010, mentioned above. The instrument package 102 also contains an orientation package 106 for determining the orientation of the AC magnetometers. For this purpose, package 106 may contain two-component or three-component accelerometers, a one-component gyroscope and a 3-component earth field DC magnetometer for detecting vector components of the Earth's field. These apparent Earth field measurements can also be used to determine the static magnetic field generated by the target well and thus the relative location of the target well using well known methods of static field analysis.

The drill bit instrument sub 102 also has an AC voltage amplifier 107, whose input terminals are connected to measure the voltage difference between the outer sleeve 116 and the drilling motor which is connected to the drill bit instrument body 70. The AC voltage recorded gives the polarity and magnitude of the electric field in the nearby Earth and thus a direct measurement of the sense of the AC current flow on the target well relative to the AC magnetic fields $Hx1$, $Hx2$, $Hy1$, $Hy2$, and $Hz$. With a symmetric AC current waveform on the target well there may be some ambiguity in the sense of the current flow which is removed by this measurement. This sign ambiguity can also be determined by including an even time harmonic component to the AC current injected into the formations. In many cases this ambiguity also can be removed by well known, indirect means such as by noting the character of measurements at other nearby depths.

The magnetometer components 103, 104, and 105, the orientation package 106, and the AC amplifier 107 are connected to a down-hole control computer 108 in the instrument 102 for preliminary processing of received data and the computer is, in turn, connected to a communications solenoid coil 110 for wirelessly transmitting data to the wireline instrument package 94, illustrated in FIG. 4. Although such solenoids have a limited communication range when used underground, sufficient power is provided by a battery pack 112 to provide reliable data communication between the drill sub instrument 102 and the wireline instrument 94, which is normally less than about 30 meters distant. In order to preserve power, the computer 108 contains control circuitry that responds to the presence of output signals from the magnetometers 103, 104 and 105, in response to magnetic fields generated in the target, to turn the instrument off off when it is not being used, and on when field measurements are to be made.

Figure 5:
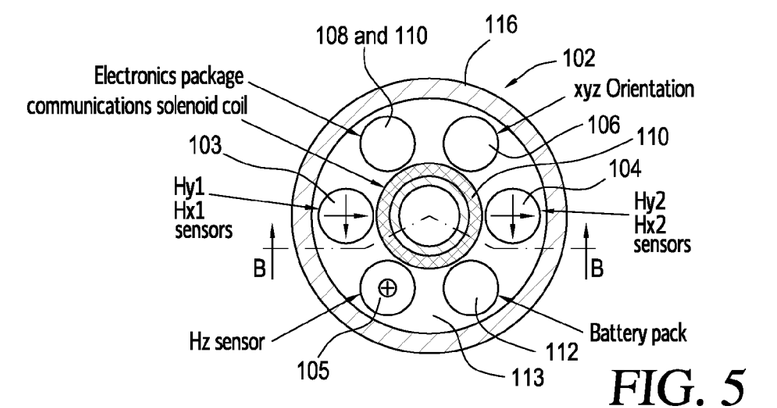
FIG. 5 is a top sectional view of a drill bit sub and included sensor package in accordance with the invention, taken along lines A-A of FIG. 6.
Figure 6:
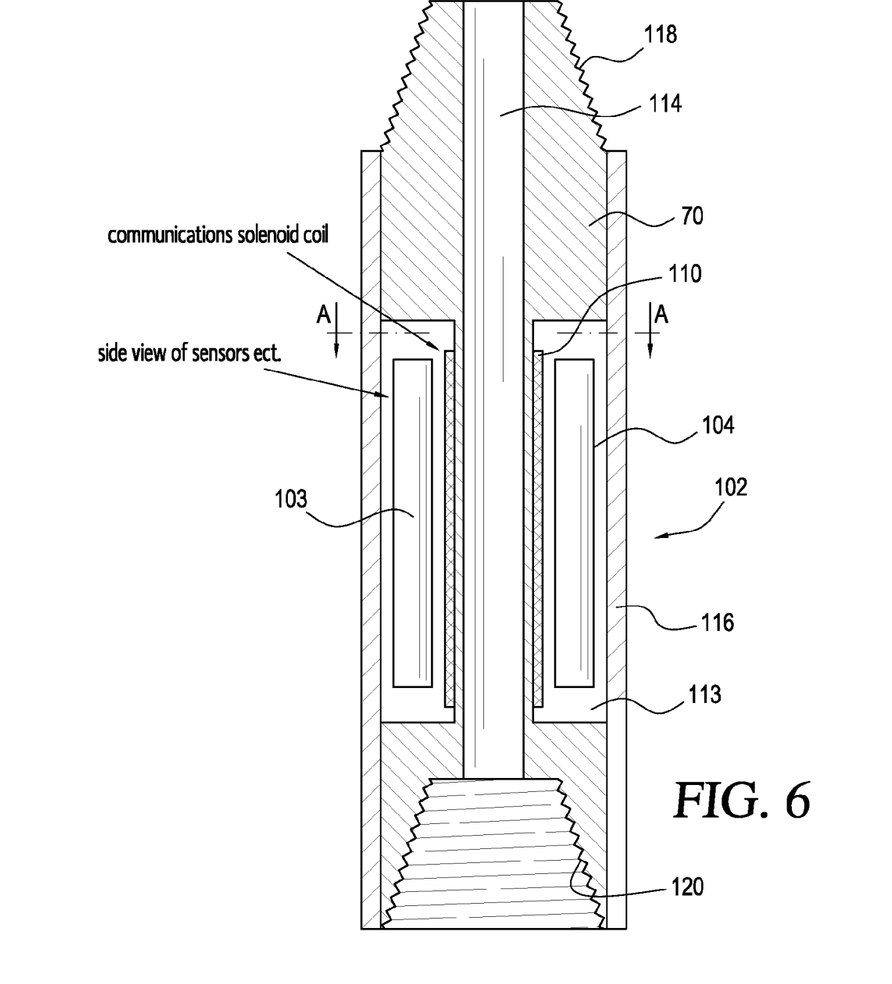
FIG. 6 is a cross-sectional view of the drill bit sub and sensor package, taken along lines B-B of FIG. 5.

As illustrated in FIGS. 5 and 6, the drill bit instrument 102 is mounted in a cavity 113 in the drill bit sub 70. The sub 70 surrounds an axial opening 114 through which the drill motor shaft 66 extends to drive the drill bit 68, with the communication solenoid 110 being wrapped around the inner wall of cavity 113 to surround the axial opening 114. Cavity 113 is covered by a stainless steel cover tube 116 that is secured in place on the drill bit sub by a suitable insulating adhesive. The drill bit sub 70 is threaded at its upper end 118 to engage the threaded lower end of housing 64, while the lower end 120 of sub 70 is threaded to receive the drill bit.

Figure 7:
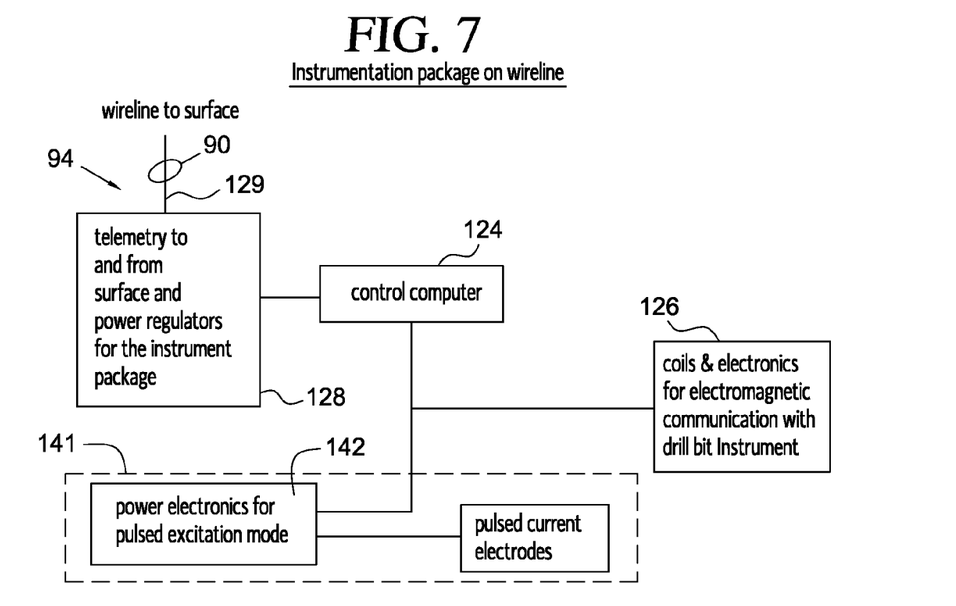
FIG. 7 is a diagrammatic illustration of a wireline instrument package suitable for use in the present invention.

The main wireline instrument package 94 carried at the end of the wireline 90 is illustrated schematically in FIG. 7 as incorporating a control computer 124 connected to a suitable electromagnetic communication circuit 126, which may be a solenoid such as the coil 110 illustrated in FIG. 6, for receiving data from the drill bit instrument 102, and, optionally, for controlling the operation of instrument 102. The computer 124 also is connected to computer 42 at the surface through telemetry 128 and a data cable 129 carried by wireline 90.

In accordance with the method of the present invention, drilling of a relief borehole is carried out, for the most part, in the known manner illustrated in FIG. 1, but using the drill string structure described with respect to FIGS. 3, 4, 5 and 6. Drilling fluid flows down through the center of the drill string 50 to provide driving power for the hydraulic drilling motor 62, and the direction of drilling is controlled by turning the drill string so that the borehole will be drilled in the direction faced by the bent housing and the drill bit. The drill bit instrument 102 in sub 70 rotates with the drill bit, but is turned off during drilling, while the MWD system 88 controls the drilling operation in known manner.

In order to precisely measure the distance and direction from the drill bit to the target to permit accurate guidance of further drilling, the drilling is stopped, and the wireline 90, with at least the first electrode 92 and with its instrument package 94, is lowered down the center of the drill string. If necessary, the drilling fluid can be pumped to assist in carrying the wireline down the drill string. The instrument 94 is lowered into the nonmagnetic sub 84 so that the wireline electrode 92 is positioned in its corresponding drill pipe electrode section 57. The electrodes are in effective electrical contact with each other, so that when power is supplied from source 24, the drill pipe section 57 acts as an injection electrode for injecting electrical current into the earth surrounding the borehole. Although the power supply is preferably a low-frequency AC source, as described above, a DC source may be used if desired, with down hole switching providing alternating or pulsed current to the surrounding earth formations. The pipe section 57 produces current flow in the earth by contacting the earth directly or through the drilling fluid that flows up-hole around the outside of the drill string from the region of the drill bit to the surface.

As noted in FIG. 3, standard steel drill pipe sections, such as sections 57, 58 and 59, are usually 10-meter long threaded pipes, the nonmagnetic pipe section 84 is also nominally 10 meters long, and the threaded, electrically insulating subs, such as subs 71, 72 and 82, are each about 1 meter in length. The standard hydraulic motor housing 64 is nominally 10 meters long, and the rotating drill bit shaft 66 with its bit 68 and instrument sub 70 is about 1.5 meters long. When the drill string is assembled, then, the relative locations of the nonmagnetic sub 84 and the electrode pipe sections 57 are known, as is the total length of the drill string, so that the wire line can easily be positioned in the drill string with the wireline electrode 92 properly located centrally along the length of its corresponding drill pipe electrode sections. The distance between the electrode 92 and the drill head 68 will depend on the number of pipe sections inserted between sections 59 and 60 (in FIG. 3), but desirably this distance will be approximately 70 meters.

Figure 8:
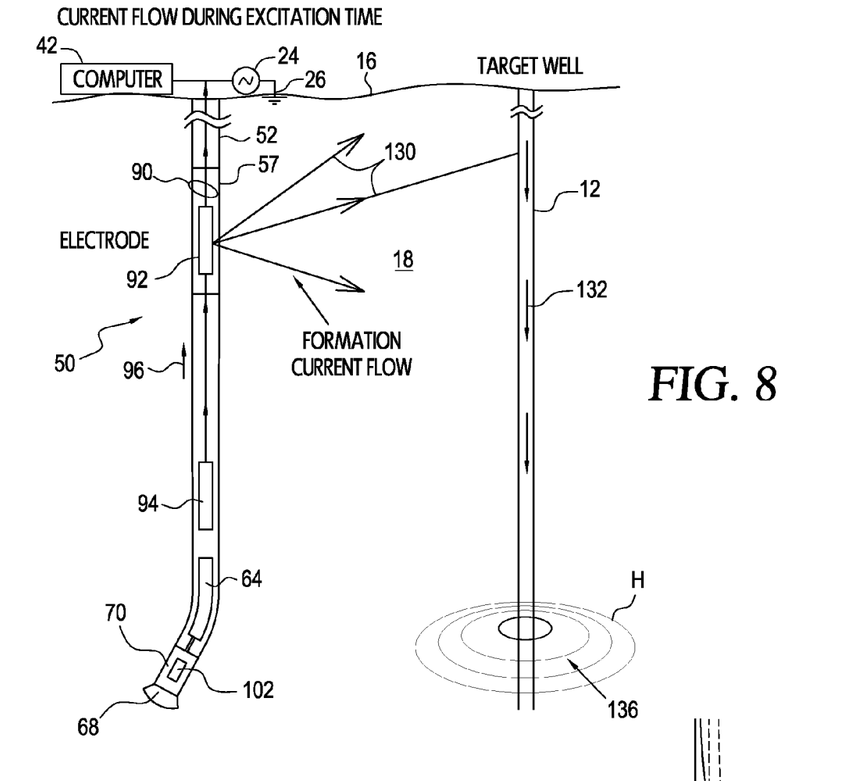
FIG. 8 is a diagrammatic illustration of formation and target current flow for the system of the present invention.

After the wireline 90 is positioned in the drill string, electrode 92 is energized, as illustrated in FIG. 8, to inject several amperes of current 130 having, for example, a frequency of about 1 to 20 Hertz, into the earth formation 18 surrounding the target well 12 and the relief well 52. As in the prior art described with respect to FIGS. 1 and 2, the injected current flow through the earth to eventually return to the ground point 26, with part of this alternating current flowing through the conductive path of least resistance in target well 12, as illustrated at 132 in FIG. 8. The target current 132 has the amplitude vs. depth characteristic illustrated by FIG. 2, with the maximum current on the target occurring at a depth that is approximately midway between the electrode 92 and the earth's surface, and at a similar distance below the level of the electrode. The current 132 produces a corresponding target magnetic field 136 around target well 12, as was described with respect to FIG. 1, which field is detectable by the drill bit instrument 102. At the drill bit, target field vectors and other measurements are processed and transmitted electromagnetically to the wireline instrument package 94 for retransmission to the computer 42 at the earth's surface. Since this target field is measured at the drill bit, the calculations made by computer 42 of the distance and direction from the bit to the target are more accurate than would be possible at the depth of the wireline instrument package 94 or with measurements made at the conventional MWD instrument located above the motor 64.

In another form of the present invention, the AC excitation current 96 that is supplied to wireline electrode 92 is also supplied to a second wireline electrode (not shown) that is supported on the wireline below or above the electrode 92 and aligned with a second electrically isolated drill pipe electrode spaced correspondingly below or above the drill pipe electrode 57. This two-electrode system operates in a manner similar to that described above.

Figure 9A:
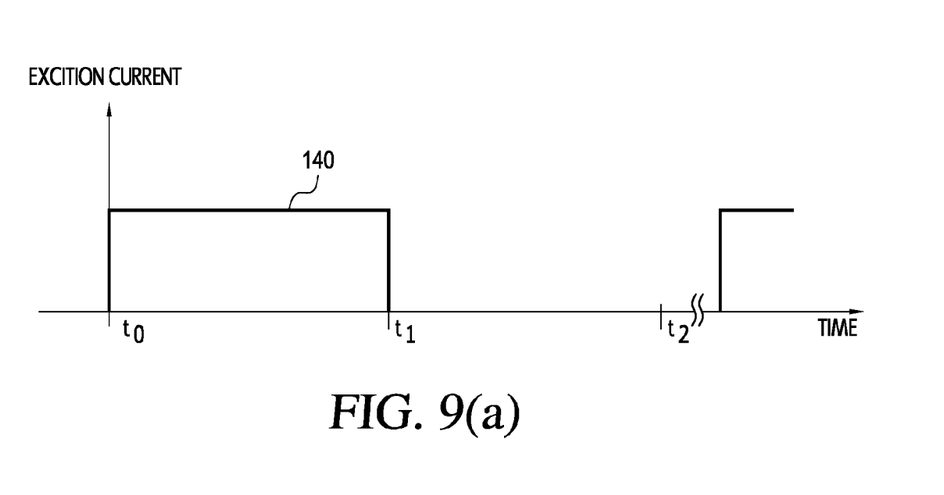
Figure 9B:
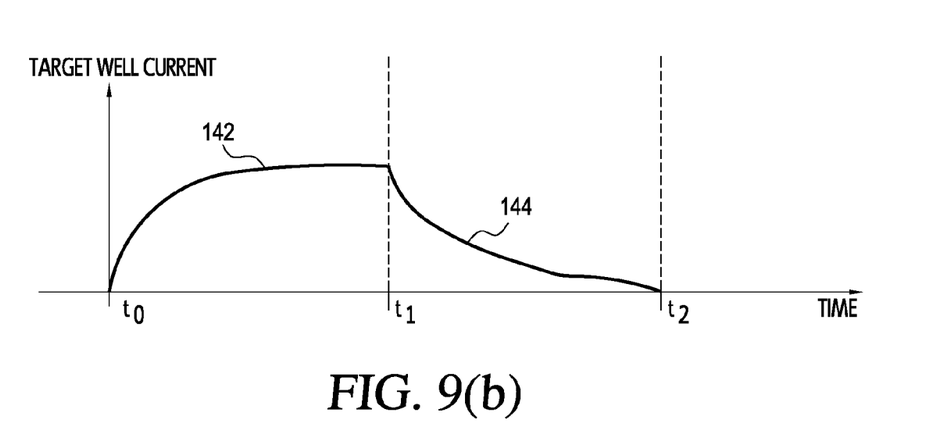
Figure 10:
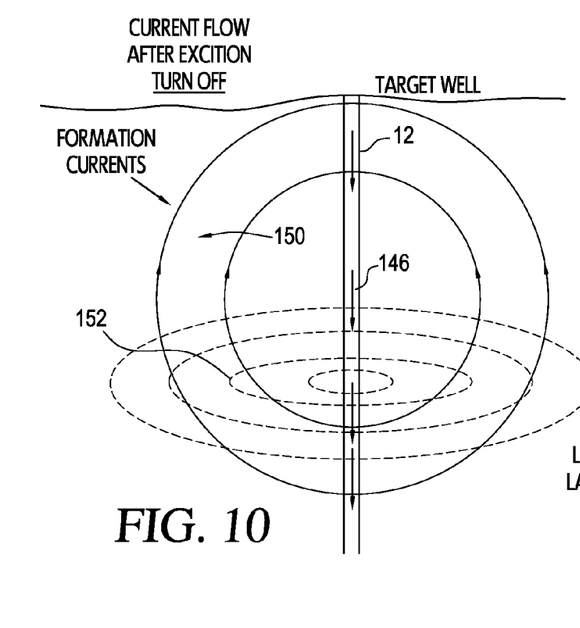
FIG. 10 illustrates formation magnetic fields generated by a decaying target current flow.
Figure 11:
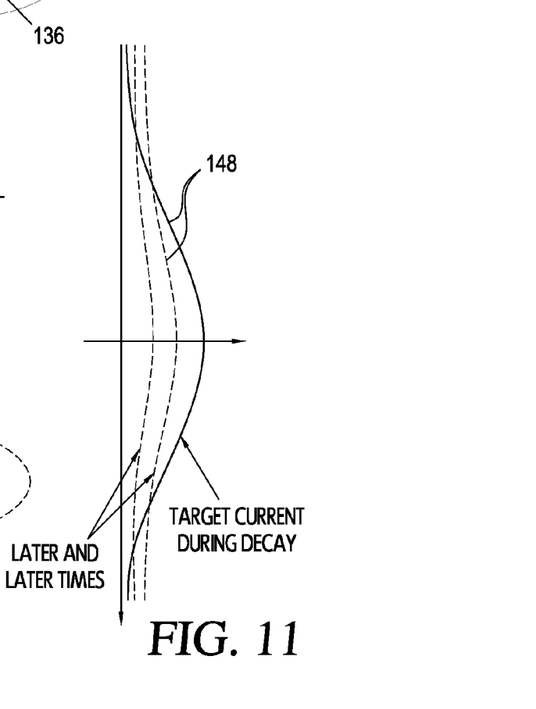
FIG. 11 illustrates decaying current flow amplitudes in a target.

In still another form of the invention, the current 96 supplied to the two-electrode configuration described above may be a transient pulsed signal, as illustrated by the square wave 140 in FIG. 9(a), which starts at time $t_0$ and stops at time $t_1$ and has a repetition rate of multiple times per second. The current 96 may be several amperes in amplitude, and produces a corresponding formation current 130 and target current 132. The current path forms an inductive loop in the two-electrode configuration, and causes the target well current 132 to increase from $t_0$ to $t_1$ as illustrated by curve 142 in FIG. 9(b), and at time $t_1$, when the square wave pulse ends, the target well current begins to decay, as illustrated by curve 144. This "L/R" time decay is about 1.5 milliseconds for typical earth formations in an environment such as an oil field and is illustrated in FIG. 10 as a decay current 146 in well 12. This decay current in the target well decreases in amplitude over time as illustrated by curves 148 in FIG. 11, flows into the surrounding formation, as indicated at 150, and produces a decay current magnetic field 152 surrounding the target well, as illustrated in FIG. 10. The vector components of this target magnetic field 152 are detected by the magnetometers 103, 104, and 105 in the drill bit sensor instrument 102, with the AC field measurements being made at 102 during the decay period $t_1$ to $t_2$. The measurements made during this time are free of the interference that is caused by magnetic fields generated by the drilling well currents 96, by related leakage currents, and by formation effects, thereby providing more accurate and reliable measurements for use in determining the location of the target.

The AC field measurement data, the AC voltage data, and the orientation measurement data obtained by the drill bit sensor instrument 102 are partially processed by control computer 108 and are sent by the two-way electromagnetic communication package 110 to the main instrument package 94 on the wireline. This data is then transmitted up-hole by way of the data cable on wireline 90 to the surface computer 42 for processing. If desired, this computer may then send appropriate control signals by way of wireline 90 to the instrument 94, which may transmit these control signals electromagnetically to the drill bit control computer 108 to turn the sensor package 102 off. Alternatively, the sensor package may be turned off automatically when it no longer detects a target magnetic field. The wireline is then withdrawn from the drill string, and drilling operations resume, using directional controls derived from the distance and direction data obtained from the downhole magnetic field and orientation data at the bit instrument 102 to guide further drilling via the MWD instrumentation.

Although the present invention has been described in terms of preferred embodiments, it will be understood that numerous modifications and variations in the apparatus described herein may be made without departing from the true spirit and scope of the invention as set out in the following claims.

What is claimed is:

1. Apparatus for deep well measurements in a borehole being drilled, comprising:
   a drill string having multiple drill pipe sections connected end-to-end and carrying a drill bit;
   at least one of said drill pipe sections being electrically conductive to provide an electrode section;
   at least one electrically insulating drill pipe sub electrically isolating said electrode section from adjacent drill pipe sections;
   an electrode locatable within and in electrical communication with said at least one drill pipe electrode section;
   a first, drill bit instrument package secured to said drill bit; and
   a second instrument package for communication with said drill bit instrument package.

2. The apparatus of claim 1, further including first magnetic field sensors mounted in said first instrument package for detecting vector components of a time-varying magnetic field.

3. The apparatus of claim 2, further including second magnetic field sensors mounted in said first instrument package for detecting static magnetic field vectors.

4. The apparatus of claim 1, further including a time-varying power source in electrical communication with said at least one drill pipe electrode section by way of said at least one electrode for injecting electrical currents into earth formations surrounding said borehole.

5. The apparatus of claim 4, wherein said drill string includes:
   two electrically conductive drill pipe electrode sections spaced apart along the length of the drill string and electrically isolated from each other and from adjacent drill pipe sections by at least one additional electrically insulating drill pipe sub; and
   two electrodes, each electrode being within and in electrical communication with a corresponding one of said two drill pipe electrode sections.

6. The apparatus of claim 5, wherein said time-varying power source is connected to both of said electrodes to energize said drill pipe electrodes electrode sections.

7. The apparatus of claim 1, further including a drilling motor connected at the distal end of said drill string between said drill pipe sections and said drill bit to drive said drill bit.

8. The apparatus of claim 1, further including an accelerometer mounted in said drill bit instrument package.

9. The apparatus of claim 1 wherein said second instrument package is carried by a wireline in said drill string.

10. The apparatus of claim 1 wherein said electrode is connected to a wireline in said drill string.

11. The apparatus of claim 10, wherein said time-varying power source is connected to said electrode by way of said wireline in said drill string.

12. Apparatus for deep well measurements in a borehole being drilled, comprising:
    a drill string having multiple drill pipe sections connected end-to-end and carrying a drill bit;
    a drilling motor connected at the distal end of said drill string between said drill pipe sections and said drill bit to drive said drill bit;
    at least one of said drill pipe sections being electrically conductive to provide an electrode section;
    at least one electrically insulating drill pipe sub electrically isolating said electrode section from adjacent drill pipe sections;
    a wireline within said drill string and incorporating an electrode locatable within and in electrical communication with said at least one drill pipe electrode section:
    a first, drill bit instrument package secured to said drill bit;
    a second instrument package for communication with said drill bit instrument package, wherein said second instrument package is located within said drill string above said drilling motor, wherein said drill bit is located below said drilling motor, and wherein said drill bit instrument package is mounted within a housing at said drill bit;
    first magnetic field sensors mounted in said drill bit instrument package for detecting varying magnetic fields; and
    an AC amplifier mounted in said drill bit instrument package for measuring the electric field between said drilling motor and said housing to resolve sign ambiguity of detected magnetic fields.

13. The apparatus of claim 12 further including:
    second magnetic field sensors mounted in said first instrument package for detecting static magnetic fields; and
    a transmitter in said first instrument package for communicating with a corresponding receiver in said second instrument package.

14. The apparatus of claim 13 wherein said transmitter in said drill bit instrument package includes a solenoid coil for transmitting said data.

15. Apparatus for deep well measurements in a borehole being drilled to determine the distance and direction from the borehole to a target, comprising:
    a drill string in said borehole, the drill string having multiple drill pipe sections connected end-to-end and carrying at a distal end a drill bit sub;
    at least one of said drill pipe sections being electrically conductive to provide an electrode section;
    at least one electrically insulating drill pipe sub electrically isolating said electrode section from adjacent drill pipe sections;
    a wireline locatable within said drill string and incorporating an electrode locatable within, and in electrical communication with, said drill pipe electrode section;
    a power supply connectable through said wireline to said at least one wireline electrode for energizing said drill pipe electrode section to inject current into the earth surrounding said borehole and to produce a corresponding current flow in said target;
    a drill bit instrument package secured to said drill bit sub and including first magnetic field sensors for detecting vector components of time-varying magnetic fields produced by current flow in said target;
    a wireline instrument package carried by said wireline and locatable within a nonmagnetic drill pipe section; and
    telemetry for communication between said drill bit instrument package and said wireline instrument package for transmitting data corresponding to said vector components from said drill bit instrument package to said wireline instrument package.

16. The apparatus of claim 15, wherein said drill string includes two electrically conductive drill pipe electrode sections spaced apart along the length of the drill string and electrically isolated from each other and from adjacent drill pipe sections by at least one additional electrically insulating drill pipe sub, and wherein said wireline incorporates two electrodes, each electrode being locatable within a corresponding drill pipe electrode section.

17. A method for deep well measurements in a borehole being drilled for determining the direction from the borehole to a target, comprising:
    locating a drill string in said borehole, the drill string having multiple drill pipe sections connected end-to-end and carrying at a distal end a drill bit sub;
    providing at least one electrically conductive drill pipe electrode section in said drill string;
    electrically isolating said electrode section from adjacent drill pipe sections;
    positioning a first electrode within, and in electrical communication with, said drill pipe electrode section;
    supplying a time-variable current to said first electrode for energizing said drill pipe electrode section to inject said current into the earth surrounding said borehole and to produce a corresponding time-variable current flow in said target;
    detecting vector components of time-varying magnetic fields produced by current flow in said target at a first instrument package located at said drill bit sub;
    transmitting data corresponding to said time-varying magnetic field to a second instrument package located within a nonmagnetic drill pipe section; and
    determining from said data the direction from said drill bit sub to said target.

18. The method of claim 17, including determining from said data the distance from said drill bit to said target.

19. The method of claim 18, further including detecting vectors of static earth magnetic fields at said first instrument package; and
    transmitting data corresponding to said static earth field vectors to said second instrument package.

20. The method of claim 17, further including supplying said variable current to two spaced-apart drill stem electrodes to produce corresponding currents in the earth surrounding the borehole and in said target.

21. The method of claim 20, wherein supplying said variable current comprises supplying a transient pulsed current having a decay period to produce a corresponding current having a decay period in said target.

22. The method of claim 21, wherein detecting vectors of said varying magnetic fields produced by current flow in said target is carried out during the decay period of said target current.

23. The method of claim 22, further including transmitting said vector data from said second instrument package to a computer for determining the location of said target with respect to said drill bit sub.

24. The method of claim 21, further including resolving the sign ambiguity of detected magnetic fields.

25. The method of claim 17, wherein positioning said first electrode includes:
   mounting said first electrode and said second instrument package at spaced locations on a wireline; and
   lowering said wireline into the drill string to locate said electrode in said conductive drill string section and to locate said second instrument package in a nonmagnetic section of said drill string.

\* \* \* \* \*